(12) United States Patent
Chen

(10) Patent No.: US 10,938,617 B2
(45) Date of Patent: Mar. 2, 2021

(54) PHASE ADJUSTMENT METHOD, RELATED DEVICE, AND COMMUNICATIONS SYSTEM

(71) Applicant: Huawei Technologies Co., Ltd., Shenzhen (CN)

(72) Inventor: Qingyong Chen, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/585,558

(22) Filed: Sep. 27, 2019

(65) Prior Publication Data
US 2020/0028727 A1 Jan. 23, 2020

Related U.S. Application Data

(63) Continuation of application No. PCT/CN2018/079633, filed on Mar. 20, 2018.

(30) Foreign Application Priority Data

Mar. 29, 2017 (CN) .......................... 201710198797.4

(51) Int. Cl.
*H04L 27/36* (2006.01)
*H04L 27/34* (2006.01)
*H04L 27/38* (2006.01)

(52) U.S. Cl.
CPC ........ *H04L 27/366* (2013.01); *H04L 27/3405* (2013.01); *H04L 27/38* (2013.01)

(58) Field of Classification Search
CPC ............. H04L 27/3444; H04L 27/3427; H04L 27/3405
See application file for complete search history.

(56) References Cited

U.S. PATENT DOCUMENTS

| | | | |
|---|---|---|---|
| 2007/0192048 A1 | 8/2007 | Hu et al. | |
| 2008/0256417 A1* | 10/2008 | Andersson | H03M 13/2732 714/762 |

(Continued)

FOREIGN PATENT DOCUMENTS

| CN | 101286757 A | 10/2008 |
|---|---|---|
| CN | 104717035 A | 6/2015 |

(Continued)

OTHER PUBLICATIONS

Divsalar, D., "Multiple-Symbol Differential Detection of MPSK," IEEE Transactions on Communications, vol. 38, No. 3, XP000113737, Mar. 1990, 10 pages.

(Continued)

*Primary Examiner* — Kevin Kim
(74) *Attorney, Agent, or Firm* — Slater Matsil, LLP

(57) ABSTRACT

A phase adjustment method, a related device, and a system, the method comprising obtaining phases and amplitudes of M symbols adjusting a phase of each of the M symbols to an adjusted phase, wherein the adjusting the phase of each of the M symbols to the adjusted phase includes performing at least one of setting the adjusted phase of the first symbol to the phase of the respective symbol, or setting the adjusted phase of a symbol greater than the first symbol according to the phase of the respective symbol and further according to a sum of phases of all symbols whose amplitudes are greater than an amplitude threshold in a group of one or more symbols from a first symbol to an $(i-1)^{th}$ symbol.

19 Claims, 5 Drawing Sheets

(56) References Cited

U.S. PATENT DOCUMENTS

2010/0239267 A1    9/2010    Kikuchi
2014/0075271 A1*    3/2014    Petrov ............... H03M 13/2792
                                                                                     714/776

FOREIGN PATENT DOCUMENTS

| CN | 107846378 A | 3/2018 |
|---|---|---|
| GB | 2376611 A | 12/2002 |
| WO | 2012117374 A1 | 9/2012 |
| WO | 2017016443 A1 | 2/2017 |

OTHER PUBLICATIONS

May, T. et al., "Performance Analysis of Viterbi Decoding for 64-DAPSK and 64 QAM Modulated OFDM Signals," IEEE Transactions on Communications, vol. 46, No. 2, XP011009117, Feb. 1998, 10 pages.

Navarro, J.R. et al., "Adaptive Boundaries Scheme for Cycle-Slip Mitigation in C-mQAM Coherent Systems," IEEE Photonics Technology Letters, vol. 27, No. 20, XP011669454, Oct. 15, 2015, 4 pages.

Rohling, H. et al., "Differential Amplitude Phase Shift Keying (DAPSK)—A New Modulation Method for DTVB," International Broadcasting Convention, XP006528913, Sep. 14-18, 1995, 8 pages.

Tolmachev, A. et al., "Efficient Multiplier-Free FPGA Demonstration of Polar-Domain Multi-Symbol-Delay-Detector (MSDD) for High Performance Phase Recovery of 16-QAM," Optical Society of America, Technical Digest, XP032426929, 2013, 4 pages.

Webb, W.T. et al., "Bandwidth Efficient QAM Schemes for Rayleigh Fading Channels," IEEE Proceedings, No. 3, Part 1, XP000237261, Jun. 1991, 8 pages.

"Part 11: Wireless LAN Medium Access Control (MAC) and Physical Layer (PHY) Specifications, Amendment 3: Enhancements for Very High Throughput in the 60 GHz Band, IEEE Standard for Information Technology—Telecommunications and Information Exchange between Systems, Local and Metropolitan Area Networks—Specific Requirements," IEEE Standards Association, IEEE Std 802.11ad, Dec. 28, 2012, 628 pages.

* cited by examiner

US 10,938,617 B2

PHASE ADJUSTMENT METHOD, RELATED DEVICE, AND COMMUNICATIONS SYSTEM

CROSS-REFERENCE TO RELATED APPLICATIONS

This application is a continuation of International Application No. PCT/CN2018/079633, filed on Mar. 20, 2018, which claims priority to Chinese Patent Application No. 201710198797.4, filed on Mar. 29, 2017. The disclosures of the aforementioned applications are hereby incorporated by reference in their entireties.

TECHNICAL FIELD

The present invention relates to the communications field, and in particular, to a phase adjustment method, a related device, and a communications system.

BACKGROUND

Small envelope fluctuation of a used modulation scheme is required on a nonlinear channel. To improve utilization of a spectrum bandwidth, a signal is usually transmitted by using a high-order modulation scheme in which an amplitude and a phase are combined. When a frequency and a modulation order of a carrier are relatively high, a modulation scheme is greatly affected by phase noise.

For example, an operating frequency band of a carrier is 60 GHz in the IEEE802.11ad communication protocol, and a single carrier physics (SC PHY) and an orthogonal frequency division multiplexing physical layer (OFDM PHY) are defined in the IEEE802.11ad communication protocol. Because of a relatively high peak to average ratio (PAPR), the OFDM PHY has a high requirement for a power amplifier and is not industrialized. To lower the requirement for the power amplifier, the SC PHY supports only a modulation scheme of 16QAM (quadrature amplitude modulation) at most. If a modulation order is increased, phase noise causes extremely large interference, and a bit error rate after decoding may fail to meet a data transmission requirement.

In a current phase noise suppression method, when there is only AWGN (additive white Gaussian noise) interference, a BER (bit error rate) after 64QAM decoding rapidly decreases as an SNR (signal-to-noise ratio) increases. When PN (phase noise) exists, a linear PNC (linear phase noise control) algorithm commonly used in the industry is used to process the PN. Even if the SNR exceeds 23 dB, the BER after decoding is still maintained at approximately $10^{-3}$. Consequently, normal data transmission basically cannot be satisfied. Therefore, an existing phase noise suppression algorithm cannot effectively suppress impact of a phase deflection caused by white noise on a bit error rate.

SUMMARY

A technical problem to be resolved by embodiments of the present invention is to provide a phase adjustment method, a related device, and a communications system, to effectively suppress impact of a phase deflection caused by white noise on a bit error rate.

According to a first aspect, an embodiment of the present invention provides a phase adjustment method. First, a sending device performs encoding processing on original data to obtain a bit sequence. The original data may be a binary bit stream, and the encoding processing includes source coding and channel coding. The source coding is to compress the original data, to reduce redundancy information in the data, and the channel coding is used to add redundancy information to the data, to improve reliability of the data. The source coding includes but is not limited to Huffman coding, Shannon coding, or Fano coding, and the channel coding includes but is not limited to Turbo coding, LDPC (low-density parity-check code) coding, or interleaved coding. A binary bit sequence is obtained after the encoding processing is performed on the original data. The sending device divides the bit sequence into M bit groups, and the bit groups include an equal quantity of bits. It is assumed that each bit group includes N bits, and the sending device performs constellation mapping on the M bit groups based on a preset constellation diagram, and obtains M symbols after performing the mapping. A modulation order of the preset constellation diagram is equal to N, and the preset constellation diagram may be any constellation diagram related to an amplitude change. This is not limited in this embodiment of the present invention. The sending device obtains amplitudes and phases of the M symbols. It is assumed that the M symbols are indicated as $S_1(A_1, \phi_1)$, $S_2(A_2, \phi_2), \ldots, S_i(A_i, \phi_i), \ldots, S_{M-1}(A_{M-1}, \phi_{M-1})$, and $S_M(A_M, \phi_M)$, i indicates a sequence number of a symbol, $1 \leq i \leq M$, i is a positive integer, $A_i$ indicates an amplitude of an $i^{th}$ symbol, and $\phi_i$ indicates a phase of the $i^{th}$ symbol. The sending device adjusts the phases $\phi_i$ of the M symbols to $\theta_i$, where the amplitudes of the M symbols remain unchanged. A phase adjustment method is as follows. When i=1, $\theta_1 = \phi_1$, or when $2 \leq i \leq M$, $\theta_i = \phi_i + \phi_{sum}(i-1, A_{th})$, where $A_{th}$ indicates a preset amplitude threshold, the amplitude threshold $A_{th}$ is less than a maximum amplitude value corresponding to the preset constellation diagram, and $\phi_{sum}(i-1, A_{th})$ indicates a sum of phases of all constellation points whose amplitudes are greater than the amplitude threshold $A_{th}$ in the first constellation point to an $(i-1)^{th}$ constellation point. It should be noted that when no constellation point whose amplitude is greater than the amplitude threshold in the first constellation point to the $(i-1)^{th}$ constellation point exists, $\theta_i = \phi_i$. M symbols obtained after the phase adjustment are $S_1(A_1, \theta_1)$, $S_2(A_2, \theta_2), \ldots, S_i(A_i, \theta_i), \ldots, S_{M-1}(A_{M-1}, \theta_{M-1})$, and $S_M(A_M, \theta_M)$. The sending device modulates the M symbols obtained after the phase adjustment, to obtain modulated signals. For example, after performing single-carrier modulation/DFT-S-OFDM (discrete Fourier transform-spread-orthogonal frequency division multiplexing), resource mapping, layer mapping, and antenna port mapping on the M symbols, the sending device loads the M symbols onto a high-frequency carrier and then sends the M symbols through an antenna port. It may be understood that noise is introduced to a process in which the modulated signals sent by the sending device are transmitted on a channel. Consequently, there is an error between an amplitude and a phase of a symbol received by a receiving device and an amplitude and a phase of a symbol actually sent by the sending device. For example, the symbol sent by the sending device is $S(A, \phi)$, and a corresponding symbol received by the receiving device is $S(A+\Delta A, \phi+\phi_P+\phi_N)$, where $\Delta A$ is amplitude noise caused by white noise, $\phi_P$ is additive phase noise, $\phi_N$ is a phase deflection caused by the white noise, and $\phi_P$ and $\phi_N$ are both referred to as phase noise. The sending device sets the amplitude threshold to be between a radius of an outermost circle and a radius of a second outermost circle. Because a symbol having a larger amplitude has weaker tolerance for phase noise, and a symbol having a smaller amplitude has stronger tolerance for phase noise, in this application, phases of symbols whose amplitudes are greater than the amplitude threshold are accumulated. In this way, a symbol whose amplitude is greater than the amplitude threshold obtains a differential gain at a receive end, thereby improving interference immunity of a communications system to phase noise.

It should be noted that when the preset constellation diagram is an APSK (amplitude phase shift keying) constellation diagram, the amplitude threshold $A_{th}$ is less than a radius of the outermost circle of the APSK constellation diagram and greater than a radius of the second outermost circle, for example, radii of circles of the APSK constellation diagram are successively $r_1, r_2, \ldots, r_{K-1}$, and $r_K$ from the inside to the outside, where $r_{K-1} < A_{th} < r_K$. The sending device sets the amplitude threshold to be between the radius of the outermost circle and the radius of the second outermost circle, and a point corresponding to the amplitude threshold is a reference point. In this application, a constellation distance between the reference point and a non-reference point is increased, to reduce a probability that a receiving device end incorrectly determines a symbol.

In implementation of the foregoing embodiment, the sending device accumulates a constellation phase of a symbol and a phase of a symbol whose amplitude is greater than the amplitude threshold in previous symbols $\phi_N$. When receiving the symbol, the receiving device obtains a difference between the phase of the symbol and a previous closest symbol whose amplitude is greater than the amplitude threshold, to obtain a differential phase gain, thereby effectively eliminating a phase deflection caused by white noise introduced to a process in which the symbol is transmitted on a channel, and improving interference immunity to the phase deflection caused by the white noise.

In a possible implementation of the first aspect, the preset constellation diagram includes an APSK constellation diagram, a QAM constellation diagram, and an order of the preset constellation diagram is equal to a quantity of bits in each symbol. It should be noted that all constellation diagrams in this application are constellation diagrams related to amplitude modulation, that is, an amplitude of a constellation point in the constellation diagram has a change.

In a possible implementation of the first aspect, the first symbol in the M symbols is a pilot symbol, the pilot symbol is generated by performing constellation mapping on a known bit, and symbols other than the first symbol in the M symbols all carry service data. In this way, each piece of service data can obtain a differential gain at the receiving device end, thereby further improving immunity to a phase deflection caused by white noise in a process of transmitting the service data.

It should be noted that the sending device may modulate a plurality of symbol sets in a parallel manner. For a method for modulating a symbol in each symbol set, refer to the method according to the first aspect and the implementations of the first aspect. In this way, efficiency of modulating data by the sending device can be improved.

According to a second aspect, an embodiment of the present invention provides a phase adjustment method. First, a receiving device receives modulated signals sent by a sending device, and performs demodulation processing on the modulated signals to obtain M symbols. The receiving device obtains amplitudes and phases of the M symbols. It is assumed that the M symbols are indicated as $S'_1(B_1, \alpha_1)$, $S'_2(B_2, \alpha_2), \ldots, S'_i(B_i, \alpha_i)$, and $S'_M(B_M, \alpha_M)$, i indicates a sequence number of a symbol, $1 \leq i \leq M$, i is a positive integer, $B_i$ indicates an amplitude of an $i^{th}$ symbol, and $\alpha_i$ indicates a phase of the $i^{th}$ symbol. The receiving device adjusts the phases $\alpha_i$ of the M symbols to $\beta_i$, where the amplitudes remain unchanged. A phase adjustment method is as follows.

When i=1, $\beta_1 = \alpha_1$, or when $2 \leq i \leq M$, $\beta_i = \alpha_i - \alpha_{min}(i-1, B_{th})$, where $B_{th}$ is a preset amplitude threshold, the preset amplitude threshold $B_{th}$ is less than a maximum amplitude value corresponding to a preset constellation diagram, and $\alpha_{min}(i-1, B_{th})$ indicates a phase of a symbol that is closest to an $i^{th}$ symbol and whose amplitude is greater than the amplitude threshold $B_{th}$ in a first symbol to an $(i-1)^{th}$ symbol. A distance herein indicates a difference between sequence numbers of two symbols, for example, a distance between the first symbol and the fourth symbol is 3. M symbols obtained after the phase adjustment are $S_1(B_1, \beta_1)$, $S_2(B_2, \beta_2), \ldots, S_i(B_i, \beta_i)$, and $S_M(B_M, \beta_M)$. The receiving device performs, based on the preset constellation diagram, constellation demapping on the M symbols obtained after the phase adjustment, to obtain M bit groups. An order of a constellation diagram is equal to an order of a symbol, and a constellation diagram used by the receiving device during constellation demapping is the same as a constellation diagram used by the sending device during mapping. The receiving device performs decoding processing on the M bit groups to obtain original data.

It should be noted that the receiving device may process a plurality of symbol sets in a parallel manner. For a method for processing each symbol set, refer to the descriptions according to the second aspect. Details are not described herein again.

It should be noted that when the preset constellation diagram is an APSK constellation diagram, the amplitude threshold $B_{th}$ is less than a radius of an outermost circle of the APSK constellation diagram, for example, radii of circles of the APSK constellation diagram are successively $r_1, r_2, \ldots, r_{K-1}$, and $r_K$ from the inside to the outside, where $r_{K-1} < B_{th} < r_K$. In addition, an amplitude threshold $A_{th}$ set by the sending device is approximately equal to the amplitude threshold $B_{th}$ set by the receiving device, and $B_{th}$ fluctuates within a specified range based on $A_{th}$, for example, $(1-0.2)*A_{th} < B_{th} < (1+0.2)*A_{th}$. The sending device sets the amplitude threshold to be between the radius of the outermost circle and a radius of a second outermost circle, and a point corresponding to the amplitude threshold is a reference point. In this application, a constellation distance between the reference point and a non-reference point is increased, to reduce a probability that a receiving device end incorrectly determines a symbol.

In a possible implementation of the second aspect, the first symbol in the M symbols is a pilot symbol, and other symbols are data symbols carrying service data.

In a possible implementation of the second aspect, the preset constellation diagram includes APSK constellation diagram or QAM constellation diagram.

In a possible implementation of the second aspect, the preset constellation diagram is an APSK constellation diagram, the APSK constellation diagram has a total of K circumferences, K is an integer greater than 1, and radii of the K circumferences are respectively $r_1, r_2, \ldots, r_{K-1}$, and $r_K$ from the inside to the outside, where $r_{K-1} < B_{th} < r_K$. For example, the APSK constellation diagram is a 64APSK constellation diagram, the 64APSK constellation diagram has four circumferences, and radii of the four circumferences are respectively $r_1, r_2, r_3$, and $r_4$ from the inside to the outside, where $r_3 < B_{th} < r_4$.

According to a third aspect, an embodiment of the present invention provides a phase adjustment method. First, a sending device performs encoding processing on original data to obtain a bit sequence. The original data may be a binary bit stream, and the encoding processing includes source coding and channel coding. The source coding is used to compress original data, to reduce redundancy information in the original data, and the source coding includes but is not limited to Shannon coding, Huffman coding, or Fano coding. The channel coding is used to add redundancy information to the original data, to improve reliability of the original data, and the channel coding includes but is not limited to a Turbo coding, an LDPC coding, or interleaved coding. A binary bit sequence is obtained after the encoding processing is performed on the original data. The sending device divides the bit sequence into M bit groups, and a quantity of bits in each bit group is equal to a modulation order. The sending device performs constellation mapping on the M bit groups based on a preset constellation diagram. The preset constellation diagram may be any constellation diagram related to an amplitude change. This is not limited in this embodiment of the present invention. The sending device obtains amplitudes and phases of M symbols. It is assumed that the M symbols are indicated as $S_1(A_1, \phi_1)$ $S_2(A_2, \phi_2), \ldots, S_i(A_i, \phi_i), \ldots, S_{M-1}(A_{M-1}, \phi_{M-1})$, and $S_M(A_M, \phi_M)$ indicates a sequence number of a symbol, $1 \leq i \leq M$, i is a positive integer, $A_i$ indicates an amplitude of an $i^{th}$ symbol, and $\phi_i$ indicates a phase of the $i^{th}$ symbol. The sending device adjusts the phases $\phi_i$ of the M symbols to $\theta_i$, where the amplitudes of the M symbols remain unchanged. A phase adjustment method is as follows. When i=1, $\theta_1=\phi_1$, or when $2 \leq i \leq M$, $\theta_i=\phi_i+\phi_{i-1}+ \ldots +\phi_1$. M symbols obtained after the phase adjustment are indicated as $S_1(A_1, \theta_1), S_2(A_2, \theta_2), \ldots, S_i(A_i, \theta_i), \ldots, S_{M-1}(A_{M-1}, \theta_{M-1})$, and $S_M(A_M, \theta_M)$. The sending device modulates the M symbols obtained after the phase adjustment, to obtain modulated signals. For example, after performing single-carrier modulation/DFT-S-OFDM resource mapping, layer mapping, and antenna port mapping the M symbols, and the sending device loads the M symbols onto a high-frequency carrier and then sends the M symbols through an antenna port. It may be understood that noise is introduced to a process in which the modulated signals sent by the sending device are transmitted on a channel. Consequently, there is an error between an amplitude and a phase of a symbol received by a receiving device and an amplitude and a phase of a symbol actually sent by the sending device. For example, the symbol sent by the sending device is $S(A, \phi)$, and a corresponding symbol received by the receiving device is $S(A+\Delta A, \phi+\phi_P+\phi_N)$, where $\Delta A$ is amplitude noise caused by white noise, $\phi_P$ is additive phase noise, $\phi_N$ is a phase deflection caused by the white noise, and $\phi_P$ and $\phi_N$ are both referred to as phase noise.

In a possible implementation of the third aspect, the preset constellation diagram includes an APSK constellation diagram or a QAM constellation diagram, and an order of the preset constellation diagram is equal to a quantity of bits in each symbol. All constellation diagrams in this application are constellation diagrams related to amplitude modulation, that is, an amplitude of each constellation point in the constellation diagram has a change.

In a possible implementation of the third aspect, the first symbol in the M symbols is a pilot symbol, the pilot symbol is generated by performing constellation mapping on a known bit, and other symbols in the M symbols each are a data symbol carrying service data. In this way, each data symbol can obtain a differential gain, thereby further improving immunity to a phase deflection caused by white noise.

According to a fourth aspect, an embodiment of the present invention provides a phase adjustment method. First, a receiving device receives modulated signals sent by a sending device, and performs demodulation processing on the modulated signals to obtain M symbols. The receiving device obtains amplitudes and phases of the M symbols. It is assumed that the M symbols are indicated as $S'_1(B_1, \alpha_1)$, $S'_2(B_2, \alpha_2), \ldots, S'_i(B_i, \alpha_i)$, and $S'_M(B_M, \alpha_M)$, i indicates a sequence number of a symbol, $1 \leq i \leq M$, i is a positive integer, $B_i$ indicates an amplitude of an $i^{th}$ symbol, and $\alpha_i$ indicates a phase of the $i^{th}$ symbol. The receiving device adjusts the phases $\alpha_i$ of the M symbols to $\beta_i$, where the amplitudes of the symbols remain unchanged. A phase adjustment method is as follows. When i=1, $\beta_i=\alpha_i$, when $2 \leq i \leq M$ and an amplitude of an $(i-1)^{th}$ symbol is greater than an amplitude threshold $B_{th}$, $\beta_i=\alpha_i-\alpha_{i-1}$, or when $2 \leq i \leq M$ and an amplitude of an $(i-1)^{th}$ symbol is less than an amplitude threshold $B_{th}$, $\beta_i=\alpha_i-\alpha_{i-1}+\beta_{i-1}-\alpha'_{i-1}$, where $\alpha'_{i-1}$ indicates a hard decision phase of the $(i-1)^{th}$ symbol, and the hard decision phase indicates a phase of a constellation point closest to the symbol in a preset constellation diagram. M symbols obtained after the phase adjustment are $S_1(B_1, \beta_1), S_2(B_2, \beta_2), \ldots, S_i(B_i, \beta_i)$, and $S_M(B_M, \beta_M)$. The receiving device performs, based on the preset constellation diagram, constellation demapping on the M symbols obtained after the phase adjustment, to obtain M bit groups. An order of a constellation diagram is equal to an order of a symbol, and a constellation diagram used by the receiving device during constellation demapping is the same as a constellation diagram used by the sending device during mapping. The receiving device performs decoding processing on the M bit groups to obtain original data.

It should be noted that the receiving device may process a plurality of symbol sets in a parallel manner. For a method for processing each symbol set, refer to the descriptions according to the fourth aspect. Details are not described herein again.

It should be noted that when the preset constellation diagram is an APSK constellation diagram, the amplitude threshold $B_{th}$ is less than a radius of an outermost circle of the APSK constellation diagram, for example, radii of circles of the APSK constellation diagram are successively $r_1, r_2, \ldots, r_{K-1}$, and $r_K$ from the inside to the outside, where $r_{K-1} < B_{th} < r_K$. The sending device sets the amplitude threshold to be between the radius of the outermost circle and a radius of a second outermost circle, and a point corresponding to the amplitude threshold is a reference point. In this application, a constellation distance between the reference point and a non-reference point is increased, to reduce a probability that a receiving device end incorrectly determines a symbol.

In a possible implementation of the fourth aspect, the preset constellation diagram includes APSK or QAM.

In a possible implementation of the fourth aspect, the preset constellation diagram is a 64APSK constellation diagram, the 64APSK constellation diagram has a total of four circumferences, and radii of the four circumferences are respectively $r_1, r_2, r_3$, and $r_4$, where $r_3 < B_{th} < r_4$.

According to a fifth aspect, an embodiment of the present invention provides a sending device. The sending device has functions of implementing behavior of the sending device in the phase adjustment method according to the possible implementations of the first aspect and the third aspect. The function may be implemented by hardware, or may be implemented by executing corresponding software by hardware. The hardware or the software includes one or more modules corresponding to the functions.

In a possible implementation, the sending device includes a receiver, a transmitter, a memory, and a processor. The memory stores a group of program code, and the processor is configured to invoke the program code stored in the memory, to perform the phase adjustment method according to the possible implementations of the first aspect and the third aspect.

Based on a same invention idea, for a problem-resolving principle and beneficial effects of the apparatus, refer to the possible method implementations of the sending device and brought beneficial effects according to the first aspect and the third aspect. Therefore, for implementation of the apparatus, refer to implementation of the method. Repeated parts are not described again.

According to a sixth aspect, an embodiment of the present invention provides a receiving device. The receiving device has functions of implementing behavior of the receiving device in the phase adjustment method according to the possible implementations of the second aspect and the fourth aspect. The function may be implemented by hardware, or may be implemented by executing corresponding software by hardware. The hardware or the software includes one or more modules corresponding to the functions according to the possible implementations of the second aspect and the fourth aspect.

In a possible implementation, the receiving device includes a receiver, a transmitter, a memory, and a processor. The memory stores a group of program code, and the processor is configured to invoke the program code stored in the memory, to perform the phase adjustment method according to any possible implementation of the second aspect and the fourth aspect.

Based on a same invention idea, for a problem-resolving principle and beneficial effects of the apparatus, refer to the possible method implementations of the receiving device and brought beneficial effects according to the second aspect and the third aspect. Therefore, for implementation of the apparatus, refer to implementation of the method. Repeated parts are not described again.

According to a seventh aspect, an embodiment of the present invention provides a digital communications system, where a sending device is configured to obtain phases and amplitudes of M symbols, where M is an integer greater than 1, and the phases of the M symbols are respectively $\phi_1$, $\phi_2$, ..., and $\phi_M$, adjust the phases $\phi_i$ of the M symbols to $\theta_i$, where $1 \le i \le M$, and i is a positive integer, and when i=1, $\theta_1 = \phi_1$, or when $2 \le i \le M$, $\theta_i = \phi_i + \phi_{sum}(i-1, A_{th})$, where $\phi_{sum}(i-1, A_{th})$ indicates a sum of phases of all symbols whose amplitudes are greater than an amplitude threshold $A_{th}$ in a first symbol to an $(i-1)^{th}$ symbol, and modulate M symbols obtained after the phase adjustment, to obtain modulated signals, and send the modulated signals to the receiving device.

The receiving device is configured to receive the modulated signals sent by the sending device, and perform demodulation processing on the modulated signals to obtain M symbols, obtain phases and amplitudes of the M symbols, where the phases of the M symbols are respectively $\alpha_1$, $\alpha_2$, ..., and $\alpha_M$, and M is an integer greater than 1, adjust the phases $\alpha_i$ of the M symbols to $\beta_i$, where $1 \le i \le M$, and i is a positive integer, and i=1, $\beta_1 = \alpha_1$, or when $2 \le i \le$, $\beta_i = \alpha_i - \alpha_{min}(i-1, B_{th})$, where indicates a phase of a symbol that is closest to an $i^{th}$ symbol and whose amplitude is greater than an amplitude threshold $B_{th}$ in a first symbol to an $(i-1)^{th}$ symbol, and perform, based on the constellation diagram, constellation demapping on M symbols obtained after the phase adjustment, to obtain M bit groups, and perform decoding processing on the M bit groups to obtain original data.

In a possible implementation of the seventh aspect, the constellation diagram is an APSK constellation diagram, the APSK constellation diagram has K circumferences, K is an integer greater than 1, and radii of the K circumferences are respectively $r_1$, $r_2$, ..., $r_{K-1}$, and $r_K$ from the inside to the outside, where $r_{K-1} < A_{th} < r_K$ and $r_{K-1} < B_{th} < r_K$. The amplitude threshold $A_{th}$ set by the sending device is approximately equal to the amplitude threshold $B_{th}$ set by the receiving device, and $B_{th}$ fluctuates within a specified range based on $A_{th}$, for example, $(1-0.2)*A_{th} < B_{th} < (1+0.2)*A_{th}$.

According to an eighth aspect, an embodiment of the present invention provides a digital communications system, including a sending device and a receiving device.

The sending device is configured to obtain phases of M symbols, where M is an integer greater than 1, and the phases of the M symbols are respectively $\phi_1$, $\phi_2$, ..., and $\phi_M$, adjust the phases $\phi_i$ of the M symbols to $\theta_i$, where $1 \le i \le M$, and i is a positive integer, and when i=1, $\theta_1 = \phi_1$, or when $2 \le i \le M$, $\theta_i = \phi_i + \phi_{i-1} + \ldots + \phi_2 + \phi_1$, and modulate M symbols obtained after the phase adjustment, to obtain modulated signals, and send the modulated signals to the receiving device.

The receiving device is configured to receive the modulated signals sent by the sending device, and perform demodulation processing on the modulated signals to obtain M symbols, where M is an integer greater than 1, obtain amplitudes and phases of the M symbols, where the phases of the M symbols are respectively $\alpha_1$, $\alpha_2$, ..., and $\alpha_M$, adjust the phases $\alpha_i$ of the symbols to $\beta_i$, where $1 \le i \le M$, and i is a positive integer, and when i=1, $\beta_1 = \alpha_1$, when $2 \le i \le M$ and an amplitude of an $(i-1)^{th}$ symbol is greater than an amplitude threshold $B_{th}$, $\beta_i = \alpha_i - \alpha_{i-1}$, or when $2 \le i \le M$ and an amplitude of an $(i-1)^{th}$ symbol is less than or equal to the amplitude threshold $B_{th}$, $\beta_i = \alpha_i - \alpha_{i-1} + \beta_{i-1} - \alpha'_{i-1}$, where $\alpha'_{i-1}$ indicates a hard decision phase of the $(i-1)^{th}$ symbol, and perform, based on the constellation diagram, constellation demapping on M symbols obtained after the phase adjustment, to obtain M bit groups, and perform decoding processing on the M bit groups to obtain original data.

In a possible implementation of the seventh aspect, the constellation diagram is an APSK constellation diagram, the APSK constellation diagram has K circumferences, K is an integer greater than 1, and radii of the K circumferences are respectively $r_1$, $r_2$, ..., $r_{K-1}$, and $r_K$ from the inside to the outside, where $r_{K-1} < A_{th} < r_K$ and $r_{K-1} < B_{th} < r_K$. The amplitude threshold $A_{th}$ set by the sending device is approximately equal to the amplitude threshold $B_{th}$ set by the receiving device, and $B_{th}$ fluctuates within a specified range based on $A_{th}$, for example, $(1-0.2)*A_{th} < B_{th} < (1+0.2)*A_{th}$.

Another aspect of this application provides a computer-readable storage medium. The computer-readable storage medium stores an instruction, and when the instruction runs on a computer, the computer performs the method according to each of the foregoing aspects.

Another aspect of this application provides a computer program product including an instruction. When the instruction runs on a computer, the computer performs the method according to each of the foregoing aspects.

BRIEF DESCRIPTION OF THE DRAWINGS

To describe the technical solutions in the embodiments of the present invention or in the background more clearly, the following briefly describes the accompanying drawings required for describing the embodiments of the present invention or the background.

DETAILED DESCRIPTION OF ILLUSTRATIVE EMBODIMENTS

The following describes the embodiments of the present invention with reference to the accompanying drawings in the embodiments of the present invention.

Figure 1:
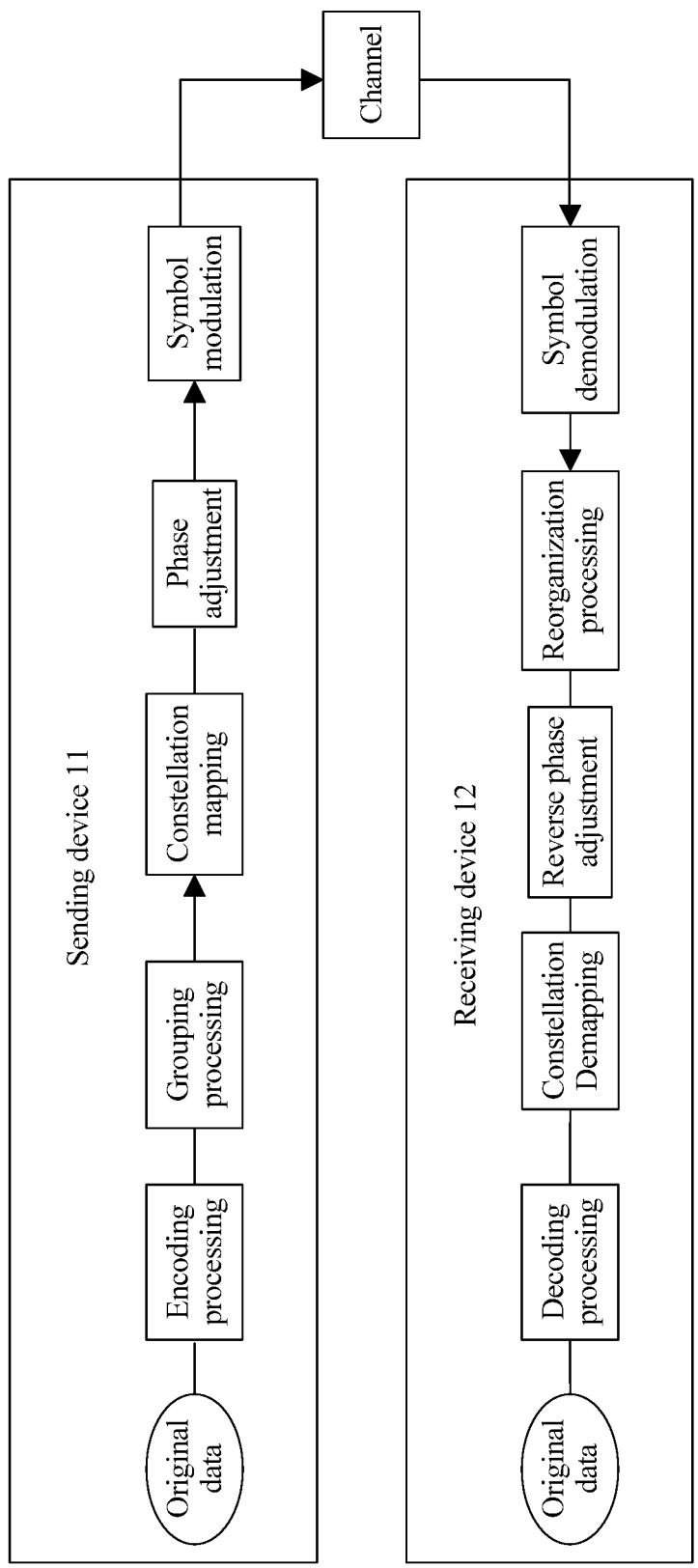
FIG. 1 is a schematic structural diagram of a digital communications system according to an embodiment of the present invention.

FIG. 1 is a schematic architectural diagram of a digital communications system according to an embodiment of the present invention. The communications system includes a sending device 11 and a receiving device 12. The digital communications system may be a global system for mobile communications (GSM), a code division multiple access (CDMA) system, a wideband code division multiple access (WCDMA) system, a worldwide interoperability for microwave access (WiMAX) system, a long term evolution (LTE) system, a 5G communications system (for example, a new radio (NR) system, a communications system integrating a plurality of communications technologies (for example, a communications system integrating an LTE technology and an NR technology), or a subsequent evolved communications system.

A processing process of the sending device 11 includes encoding processing, grouping processing, constellation mapping, phase adjustment, and symbol modulation. The sending device 11 performs encoding processing on original data. The original data may be binary data, and the encoding processing includes source coding and channel coding. The source coding is used to perform information compression on the data, to reduce redundancy information in the data, and the channel coding is used to add redundancy information to the data, to improve reliability of the data. The sending device 11 obtains a binary bit sequence after performing the encoding processing on the original data. Then the sending device 11 performs grouping processing on the bit sequence. The sending device 11 may perform grouping processing on the bit sequence based on a preset modulation order, and the modulation order is equal to a quantity of bits in each bit group. For example, the preset modulation order is N. The sending device 11 divides the bit sequence into M bit groups, and each bit group includes N bits. Afterwards, the sending device 11 performs constellation mapping on the M bit groups based on a preset N-order constellation diagram, to generate M symbols. A constellation diagram indicates a mapping relationship between a bit group and each of an amplitude and a phase. Amplitudes and phases of the M symbols obtained after the constellation mapping is performed on the M bit groups based on the N-order constellation diagram are known. It is assumed that the obtained M symbols are $S_1(A_1, \phi_1)$, $S_2(A_2, \phi_2)$, ..., $S_i(A_i, \phi_i)$, ..., and $S_M(A_M, \phi_M)$, where $1 \leq i \leq M$, M and i are positive integers, $A_i$ indicates an amplitude of an $i^{th}$ symbol, and $\phi_i$ indicates a phase of the $i^{th}$ symbol. The sending device 11 performs phase adjustment on the M symbols. Phase adjustment methods include Method 1 and Method 2. In Method 1, the phase $\phi_i$ is adjusted to $\theta_i$, where $1 \leq i \leq M$, and when i=1, $\theta_1 = \phi_1$, or when $2 \leq i \leq M$, $\theta_i = \phi_i \phi_{sum}(i-1, A_{th})$, where $A_{th}$ indicates a preset amplitude threshold, and $\phi_{sum}(i-1, A_{th})$ indicates a sum of phases of all constellation points whose amplitudes are greater than the amplitude threshold $A_{th}$ in the first constellation point to an $(i-1)^{th}$ constellation point. For example, five symbols obtained after constellation mapping are $S_1(A_1, \phi_1)$ $S_2(A_2, \phi_2)$, $S_3(A_3, \phi_3)$, $S_4(A_4, \phi_4)$, and $S_5(A_5, \phi_5)$ Assuming that $A_1 > A_{th}$, $A_2 < A_{th}$, $A_3 < A_{th}$, and $A_4 > A_{th}$, according to the phase adjustment method in Method 1 $\theta_1 = \phi_1$, $\theta_2 = \phi_2 + \phi_1$, $\theta_3 = \phi_3 + \phi_1$, $\theta_4 = \phi_4 + \phi_1$, and $\theta_5 = \phi_5 + \phi_4 + \phi_1$. Then the sending device 11 loads symbols obtained after phase adjustment onto a high-frequency carrier, and sends the symbols through an antenna port.

In Method 2, the phase $\phi_i$ is adjusted to $\theta_i$, where $1 \leq i \leq M$, and when i=1, $\theta_1 = \phi_1$, or when $2 \leq i \leq M$, $\theta_i = \phi_i + \phi_{i-1} + \ldots + \phi_1$. For example, five symbols obtained after constellation mapping are $S_1(A_1, \phi_1)$, $S_2(A_2, \phi_2)$, $S_3(A_3, \phi_3)$, $S_4(A_4, \phi_4)$, and $S_5(A_5, \phi_5)$. According to the phase adjustment method in Method 2, $\theta_1 = \phi_1$, $\theta_2 = \phi_2 + \phi_1$, $\theta_3 = \phi_3 + \phi_2 + \phi_1$, $\theta_4 = \phi_4 + \phi_3 + \phi_2 + \phi_1$, and $\theta_5 = \phi_5 + \phi_4 + \phi_3 + \phi_2 + \phi_1$.

The sending device loads M symbols obtained after the phase adjustment onto a high-frequency carrier, to generate modulated signals, and sends the modulated signals to the receiving device through a channel.

The receiving device receives the modulated signals. A process of processing the modulated signals includes symbol demodulation, reorganization processing, reverse phase adjustment, constellation demapping, and decoding processing. First, the receiving device performs symbol demodulation on the received modulated signals, to convert the high-frequency modulated signals into M symbols of a baseband. It is easily understood that because interference is introduced to a process in which a symbol is transmitted on a channel, and noise is introduced by both an amplitude and a phase of the symbol. It is assumed that the M symbols obtained through the symbol demodulation are $S_1(B_1, \alpha_1)$, $S_2(B_2, \alpha_2)$ $S_3(B_3, \alpha_3)$, ..., and $S_M(B_M, \alpha_M)$, where $1 \leq i \leq M$, i and M are positive integers, $S_i$ indicates an $i^{th}$ symbol, $B_i$ indicates an amplitude of the $i^{th}$ symbol, $\alpha_i$ indicates a phase of the $i^{th}$ symbol. Then the receiving device 12 obtains phases and amplitudes of the M symbols, and the receiving device 12 performs reverse phase adjustment on the M symbols.

In a possible implementation, when the receiving device 12 determines that the sending device 11 uses the phase adjustment method in Method 1, a corresponding reverse phase adjustment method used by the receiving device 12 is adjusting the phases $\alpha_i$ of the symbols to $\beta_i$. When i=1, $\beta_1 = \alpha_1$, or when $2 \leq i \leq M$, $\beta_i = \alpha_i - \alpha_{min}(i-1, B_{th})$, where $B_{th}$ indicates a preset amplitude threshold, and $\alpha_{min}(i-1, B_{th})$ indicates a phase of a symbol that is closest to the $i^{th}$ symbol and whose amplitude is greater than the amplitude threshold $B_{th}$ in a first symbol to an $(i-1)^{th}$ symbol. A distance herein indicates a difference between sequence numbers of two symbols, for example, a distance between two symbols $S_3$ and $S_5$ is 5−3=2. It is assumed that five symbols obtained by the receiving device 12 by performing symbol demodulation are $S_1(B_1, \alpha_1)$, $S_2(B_2, \alpha_2)$, $S_3(B_3, \alpha_3)$ $S_4(B_4, \alpha_4)$, and $S_5(B_5, \alpha_5)$. The receiving device 12 compares an amplitude of each symbol with the preset amplitude threshold $B_{th}$. Assuming that $B_1>B_{th}$, $B_2<B_{th}$, $B_3<B_{th}$, $B_4>B_{th}$, and $B_5<B_{th}$, the amplitudes of the five symbols remain unchanged, and after the phase adjustment, $\beta_1=\alpha_1$, $\beta_2=\alpha_2-\alpha_1$, $\beta_3=\alpha_3-\alpha_1$, $\beta_4=\alpha_4-\alpha_1$, and $\beta_5=\alpha_5-\alpha_4$.

In another possible implementation, when the receiving device 12 determines that the sending device 11 uses the phase adjustment method in Method 2, a corresponding reverse phase adjustment method used by the receiving device is adjusting the phases $\alpha_i$ of the M symbols to $\beta_i$. When i=1, $\beta_1=\alpha_1$, when $2\leq i\leq M$ and an amplitude of an $(i-1)^{th}$ symbol is greater than a preset amplitude threshold $B_{th}$, $\beta_i=\alpha_i-\alpha_{i-1}$, or when $2\leq i\leq M$ and an amplitude of an $(i-1)^{th}$ symbol is not greater than an amplitude threshold $B_{th}$, $\beta_i=\alpha_i-\alpha_{i-1}+\beta_{i-1}-\alpha'_{i-1}$, $\alpha'_{i-1}$ indicates a hard decision phase of the $(i-1)^{th}$ symbol, and the hard decision phase indicates a phase of a closest constellation point in a preset constellation diagram. It is assumed that five symbols obtained by the receiving device 12 by performing symbol demodulation are $S_1(B_1, \alpha_1)$, $S_2(B_2, \alpha_2)$, $S_3(B_3, \alpha_3)$, $S_4(B_4, \alpha_4)$, and $S_5(B_5, \alpha_5)$. The receiving device 12 compares an amplitude of each symbol with the preset amplitude threshold $B_{th}$. Assuming that $B_1>B_{th}$, $B_2<B_{th}$, $B_3\leq B_{th}$, $B_4>B_{th}$, and $B_5<B_{th}$, the amplitudes of the five symbols remain unchanged, and after the receiving device 12 performs reverse phase adjustment on the five symbols, $\beta_1=\alpha_1$, $\beta_2=\alpha_2-\alpha_1$, $\beta_3=\alpha_3-\alpha_2+\alpha_2-\alpha_1-\alpha'_2=\alpha_3-\alpha_1-\alpha'_2$, and $\beta_4=\alpha_4-\alpha_3+\beta_3-\alpha'_3=\alpha_4-\alpha_1-\alpha'_2-\alpha'_3$.

The receiving device 12 performs, based on the preset constellation diagram, constellation demapping on the symbols obtained after the reverse phase adjustment, to obtain M N-order bit groups, and performs decoding processing on the N bit groups, to obtain original data. The constellation demapping is an inverse process of the constellation mapping at the sending device 11, and the decoding processing is an inverse process of the encoding processing at the sending device 11. A specific process is not described in detail.

It should be noted that the sending device 11 may notify the receiving device 12 of a modulation scheme of the sending device 11 by using downlink control information, so that the receiving device 12 performs a corresponding demodulation scheme based on the modulation scheme.

A sending device and a receiving device in this application each are a device having a wireless communication function, and may be a handheld device having a wireless communication function, an in-vehicle device, a wearable device, a computing device, another processing device connected to a wireless modem, or the like. The sending device and the receiving device each may have different names in different networks, for example, user equipment, an access terminal, a subscriber unit, a subscriber station, a mobile station, a mobile console, a remote station, a remote terminal, a mobile terminal, a user terminal, a terminal, a wireless communications device, a user agent, a user apparatus, a cellular phone, a cordless phone, a session initiation protocol (SIP) phone, a wireless local loop (WLL) station, a personal digital assistant (PDA), or a terminal device in a 5G network or a future evolved network.

In implementation of the embodiments of the present invention, the sending device accumulates a constellation phase of a symbol and a phase of a symbol whose amplitude is greater than an amplitude threshold in previous symbols. When receiving the symbol, the receiving device obtains a difference between the phase of the symbol and a previous closest symbol whose amplitude is greater than the amplitude threshold, to obtain a differential phase gain, thereby effectively eliminating a phase deflection caused by white noise introduced to a process in which the symbol is transmitted on a channel, and improving interference immunity to the phase deflection caused by the white noise.

Figure 2A:
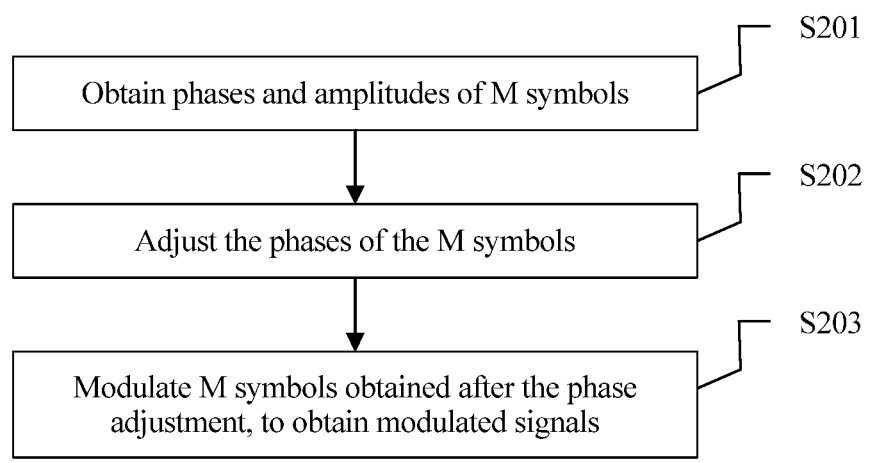
FIG. 2a is a schematic flowchart of a phase adjustment method according to an embodiment of the present invention.

FIG. 2a shows a phase adjustment method according to an embodiment of the present invention. The method includes but is not limited to the following steps.

S201: Obtain phases and amplitudes of M symbols.

Specifically, the M symbols may be constellation symbols obtained after constellation mapping, and a process of generating the M symbols may be as follows. A sending device may perform encoding processing on original data to obtain a bit sequence, divides the bit sequence into M bit groups, and performs constellation mapping on the M bit groups based on a preset constellation diagram, to obtain the M symbols. The original data may be binary data. The sending device performs processing such as source coding, channel coding, and interleaved coding on the original data. The source coding includes but is not limited to Shannon coding, Fano coding, and Huffman coding, and the channel coding includes but is not limited to LDPC coding, parity check coding, cyclic redundancy check (CRC) coding, and Turbo coding. The sending device obtains a binary bit sequence after performing the encoding processing on the original data. The sending device divides the bit sequence into the M bit groups based on a modulation order, and a quantity of bits included in each bit group is equal to the modulation order. For example, the bit sequence includes 16 bits, the modulation order is 2, the sending device divides the bit sequence into eight bit groups, and each bit group includes 2 bits. A constellation diagram indicates a mapping relationship between a bit group and coordinates of a constellation point, and the coordinates of the constellation point include an amplitude and a phase. In this embodiment, the mapping relationship between a bit group and a constellation point may be a Gray code mapping relationship, or may be another mapping relationship. An order of the constellation diagram is equal to the modulation order. For example, if the modulation order is 2, the constellation diagram is a constellation diagram having four points, if the modulation order is 4, the constellation diagram is a constellation diagram having 16 points, or if the modulation order is 6, the constellation point is a constellation diagram having 64 points. A type of the constellation diagram is not limited in this embodiment. The constellation diagram may be an APSK constellation diagram, a QAM constellation diagram, or another constellation diagram having an amplitude change feature.

The amplitudes and the phases of the M symbols obtained after the sending device maps the M bit groups to the preset constellation diagram are known. It is assumed that the M symbols are indicated as $S_1(A_1, \phi_1)$, $S_2(A_2, \phi_2)$, ..., $S_i(A_i, \phi_i)$, ..., $S_{M-1}(A_{M-1}, \phi_{M-1})$, and $S_M(A_M, \phi_M)$, i indicates a sequence number of a symbol, $1\leq i\leq M$, i is a positive integer, $A_i$ indicates an amplitude of an $i^{th}$ symbol, and $\phi_i$ indicates a phase of the $i^{th}$ symbol.

S202: Adjust the phases of the M symbols.

In a possible implementation, in a phase adjustment method 1, the sending device adjusts the phases $\phi_i$ of the M symbols to $\theta_i$, where the amplitudes of the M symbols remain unchanged. The phase adjustment method is as follows. When i=1, $\theta_1=\phi_1$, or when $2\leq i\leq M$, $\theta_i=\phi_i+\phi_{sum}(i-1, A_{th})$, where $A_{th}$ indicates a preset amplitude threshold, and $\phi_{sum}(i-1, A_{th})$ indicates a sum of phases of all symbols whose amplitudes are greater than the amplitude threshold $A_{th}$ in a first symbol to an $(i-1)^{th}$ symbol.

For example, M=5, and the five symbols are respectively $S_1(A_1, \phi_1)$, $S_2(A_2, \phi_2)$, $S_3(A_3, \phi_3)$, $S_4(A_4, \phi_4)$, and $S_5(A_5,$ $\phi_5$). A result obtained after the sending device compares the five symbols with the preset amplitude threshold is that $A_1>A_{th}$, $A_2<A_{th}$, $A_3>A_{th}$, $A_4>A_{th}$, and $A_5<A_{th}$. A result obtained after the sending device adjusts phases of the five symbols is as follows. When i=1, $\theta_1=\phi_1$, when i=2, a symbol before the symbol $S_2$ is $S_1$, and the amplitude $A_1$ of the symbol $S_1$ is greater than the amplitude threshold $A_{th}$, so that $\theta_2=\phi_2+\phi_1$, when i=3, symbols before the symbol $S_3$ are the symbol $S_1$ and the symbol $S_2$, and the amplitude of only $S_1$ in the symbol $S_1$ and the symbol $S_2$ is greater than a preset amplitude, so that $\theta_3=\phi_3+\phi_1$, when i=4, symbols before the symbol $S_4$ are the symbol $S_3$, the symbol $S_2$, and the symbol $S_1$, and amplitudes of the symbol $S_1$ and the symbol $S_3$ in the three symbols each are greater than the amplitude threshold, so that $\theta_4=\phi_4+\phi_3+\phi_1$, or when i=5, symbols before the symbol $S_5$ are $S_4$, $S_3$, $S_2$, and $S_1$, and amplitudes of the symbol $S_1$, the symbol $S_3$, and the symbol $S_4$ each are greater than the amplitude threshold, so that $\theta_5=\phi_5+\phi_4+\phi_3+\phi_1$.

In another possible implementation, in a phase adjustment method 2, the sending device adjusts the phases $\phi_i$ of the M symbols to $\theta_i$, where the amplitudes of the M symbols remain unchanged. The phase adjustment method is as follows. When i=1, $\theta_1=\phi_1$, or when $2\leq i\leq M$, $\theta_i=\phi_i+\phi_{i-1}+\ldots\phi_2+\phi_1$.

For example, M=5, and the five symbols are respectively $S_1(A_1, \phi_1)$ $S_2(A_2, \phi_2)$, $S_3(A_3, \phi_3)$ $S_4(A_4, \phi_4)$, and $S_5(A_5, \phi_5)$. A result obtained after the sending device adjusts phases of the five symbols is as follows. When i=1, $\theta_1=\phi_1$, when i=2, $\theta_2=\phi_2+\phi_1$, when i=3, $\theta_3=\phi_3+\phi_2+\phi_1$, when i=4, $\theta_4=\phi_4+\phi_3+\phi_2+\phi_1$, or when i=5, $\theta_5=\phi_5+\phi_4+\phi_3+\phi_2+\phi_1$.

S203: Modulate M symbols obtained after the phase adjustment, to obtain modulated signals.

Specifically, the sending device performs operations such as OFDM modulation, resource mapping, layer mapping, and antenna port mapping on the M symbols obtained after the phase adjustment, to obtain the modulated signals, and sends the modulated signals to a receiving device.

It should be noted that the sending device may process a plurality of symbol sets in a parallel manner by using the phase adjustment method in S201 to S203. In this way, processing efficiency of the sending device can be improved.

In a possible implementation, the first symbol in the M symbols may be a pilot symbol, symbols other than the first symbol in the M symbols each are a data symbol carrying service data, and information carried in the pilot symbol is known. In this way, all the data symbols carrying the service data can obtain differential gains during demodulation, thereby further improving immunity to phase noise.

In a possible implementation, a constellation diagram may be an APSK constellation diagram, a QAM constellation diagram, or a user-defined constellation diagram. This is not limited in this embodiment of the present invention. The constellation diagram indicates a mapping relationship between a bit group and coordinates of a constellation point, and the coordinates of the constellation point include an amplitude and a phase. In the QAM constellation diagram, constellation points are distributed in a shape of a rectangle, and there is an equal distance between every two adjacent constellation points. In the APSK constellation diagram, constellation points form a plurality of concentric circles, and a plurality of constellation points are distributed at equal intervals on each circumference. Assuming that a quantity of concentric circles in the APSK constellation diagram is K, a signal set of the APSK constellation diagram may be indicated as $X=r_k*\exp^{(2\pi*i_k/n_k+\theta_k)}$, where k=1, 2, 3, ..., K, and k is an integer greater than 1, $r_k$ indicates a radius of a $k^{th}$ circumference, $n_k$ indicates a quantity of constellation points on the $k^{th}$ circumference, $i_k$ indicates sequence numbers of the constellation points on the $k^{th}$ circumference, and $i_k=0, 1, 2, \ldots, n_k-1$, and $\theta_k$ indicates phases of the constellation points on the $k^{th}$ circumference. To fully use signal space in the APSK constellation diagram, that $n_k\leq n_{k+1}$ should be satisfied, that is a quantity of constellation points on an outer circumference is greater than or equal to a quantity of constellation points on an inner circumference.

Figure 2B:
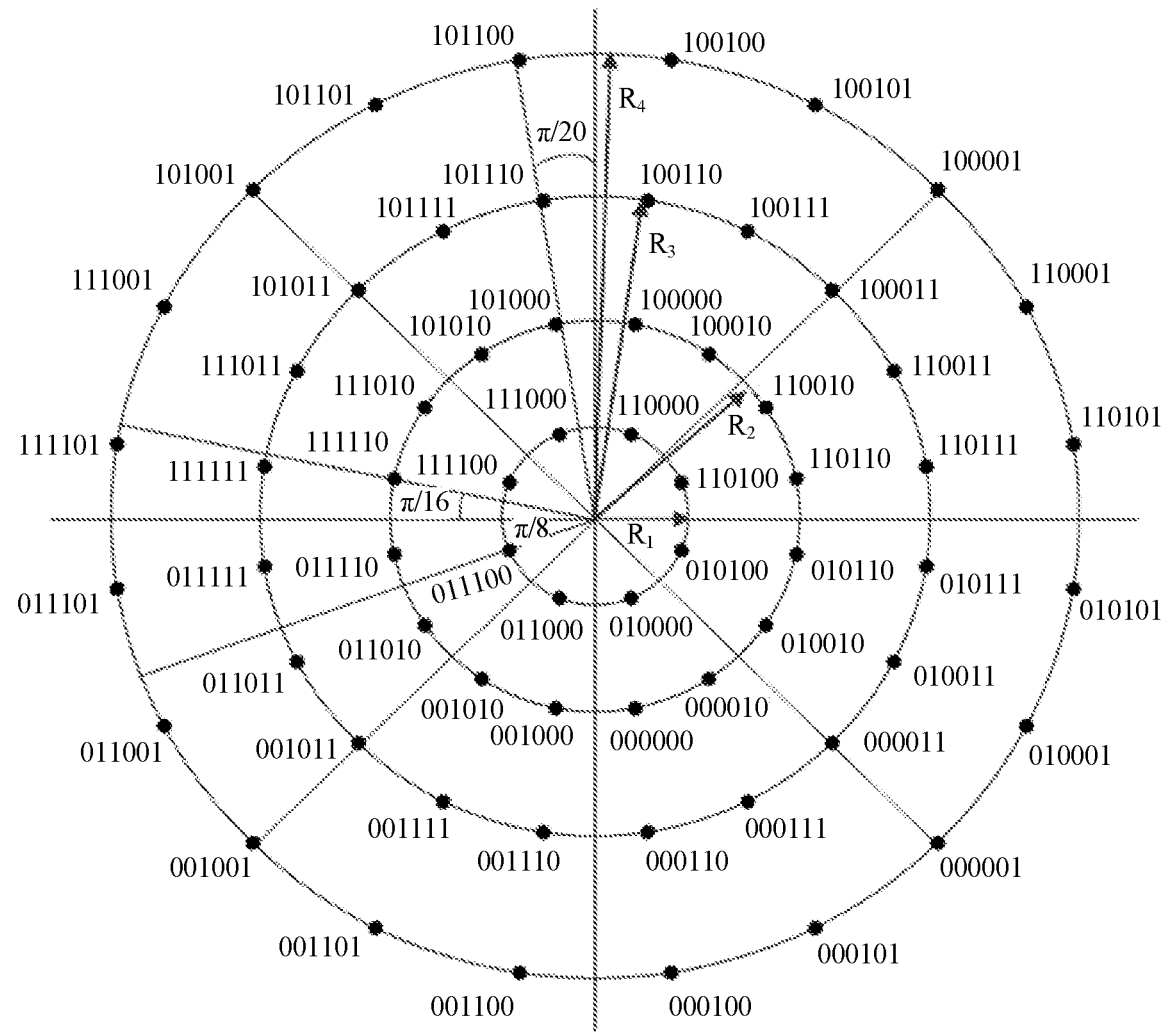
FIG. 2b is a schematic distribution diagram of a 64APSK constellation diagram.

For example, FIG. 2b is a schematic structural diagram of a 6-order APSK constellation diagram. The 6-order APSK constellation diagram is also referred to as a 64 APSK constellation diagram. The 64APSK constellation diagram has four circumferences, a ratio of radii of the four circumferences from the inside to the outside is 1:2:3:4, and quantities of constellation points on the four circumferences from the inside to the outside are respectively 8, 16, 20, and 20. 64 6-bit bit groups are mapped to 64 constellation points by using quasi Gray codes.

In implementation of this embodiment of the present invention, the sending device accumulates a constellation phase of a symbol and a phase of a symbol whose amplitude is greater than the amplitude threshold in previous symbols, so that when receiving the symbol, the receiving device obtains a difference between the phase of the symbol and a previous closest symbol whose amplitude is greater than the amplitude threshold, to obtain a differential phase gain, thereby effectively eliminating a phase deflection caused by white noise introduced to a process in which the symbol is transmitted on a channel, and improving interference immunity to the phase deflection caused by the phase noise.

Figure 3:
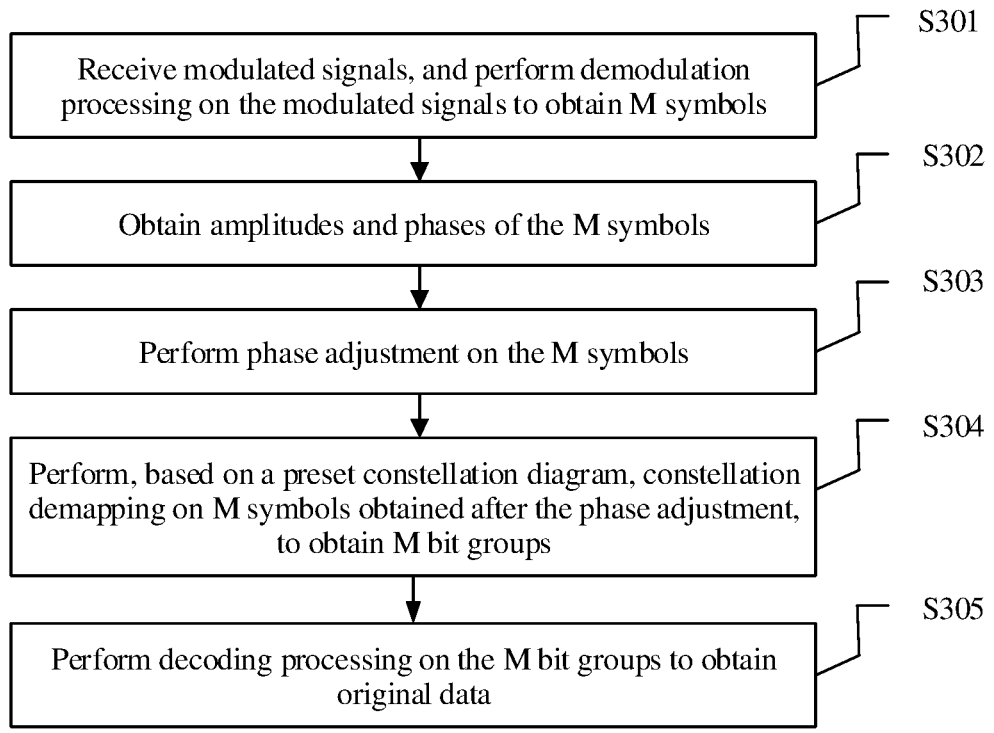
FIG. 3 is another schematic flowchart of a phase adjustment method according to an embodiment of the present invention.

FIG. 3 shows a phase adjustment method according to an embodiment of the present invention. The method includes but is not limited to the following steps.

S301: Receive modulated signals, and perform demodulation processing on the modulated signals to obtain M symbols.

Specifically, a receiving device performs processing such as channel equalization, down-conversion, and demodulation on the modulated signals sent by a sending device, to obtain the M symbols. It may be understood that noise is introduced to a process in which the M symbols generated by the sending device are transmitted on a channel. The noise includes amplitude noise, phase noise, and white noise. For example, a symbol sent by the sending device is $S(A, \phi)$, and noise is introduced to the symbol S on a channel. It is assumed that a corresponding symbol received by the receiving device is $S(A+\Delta A, \phi+\phi_P+\phi_N)$, where $\Delta A$ is amplitude noise caused by white noise, $\phi_P$ is additive phase noise, and $\phi_N$ is a phase deflection caused by the white noise. The receiving device obtains amplitudes and phases of the M symbols.

S302: Obtain the amplitudes and the phases of the M symbols.

The M symbols are indicated as $S_1(B_1, \alpha_1)$, $S_2(B_2, \alpha_2)$, ..., $S_i(B_i, \alpha_i)$, ..., and $S_M(B_M, \alpha_M)$, i indicates a sequence number of a symbol, $1\leq i\leq M$, $B_i$ indicates an amplitude of an $i^{th}$ symbol, and $\alpha_i$ indicates a phase of the $i^{th}$ symbol.

S303: Perform phase adjustment on the M symbols.

In a possible implementation, when the receiving device determines that the sending device uses Phase Adjustment Method 1 in the embodiment in FIG. 2a to perform modulation, a phase adjustment method used by the receiving device is that the receiving device adjusts the phases $\alpha_i$ of the M symbols to $\beta_i$, where the amplitudes remain unchanged. The phase adjustment method is as follows. When i=1, $\beta_1=\alpha_1$, or when $2\leq i\leq M$, $\beta_i=\alpha_i-\alpha_{min}(i-1, B_{th})$, where $B_{th}$ indicates a preset amplitude threshold, and $\alpha_{min}$ (i−1, $B_{th}$) indicates a phase of a symbol that is closest to an $i^{th}$ symbol and whose amplitude is greater than the amplitude threshold $B_{th}$ in a first symbol to an $(i-1)^{th}$ symbol. A distance herein indicates a distance between sequence numbers of two symbols, for example, a distance between a symbol $S_2$ and a symbol $S_5$ is 5−2=3. A minimum distance between symbols is 1, and this indicates that two symbols are adjacent symbols.

For example, M=5, and the five symbols are respectively $S_1(B_1, \alpha_1)$, $S_2(B_2, \alpha_2)$, $S_3(B_3, \alpha_3)$, $S_4(B_4, \alpha_4)$, and $S_5(B_5, \alpha_5)$. A result obtained after the receiving device compares amplitudes of the five symbols with the preset amplitude threshold $B_{th}$ is that $B_1>B_{th}$, $B_2<B_{th}$, $B_3<B_{th}$, $B_4>B_{th}$, and $B_5>B_{th}$. When i=1, =$\alpha_1$, when i=2, a symbol whose amplitude is greater than the threshold and that is closest to the symbol $S_2$ before the symbol $S_2$ is the symbol $S_1$, so that $\beta_2=\alpha_2-\alpha_1$, when i=3, a symbol whose amplitude is greater than the amplitude threshold and that closest to the symbol S3 before the symbol S3 is the symbol $S_1$, so that $\beta_3=\alpha_3-\alpha_1$, when i=4, a symbol whose amplitude is greater than the amplitude threshold and that is closest to the symbol S3 before the symbol S4 is the symbol $S_1$, so that $\beta_4=\alpha_4-\alpha_1$, or when i=5, a symbol whose amplitude is greater than the amplitude threshold and that is closest to the symbol $S_5$ before the symbol $S_5$ is the symbol S4, so that $\beta_5=\alpha_5-\alpha_4$.

In another possible implementation, when the receiving device determines that the sending device uses Phase Adjustment Method 2 in the embodiment in FIG. 2*a* to perform modulation, a demodulation method used by the receiving device is that the receiving device adjusts the phases $\alpha_i$ of the M symbols to $\beta_i$, where the phases of the M symbols remain unchanged. When i=1, $\beta_1=\alpha_1$, when 2≤i<M and an amplitude of an $(i-1)^{th}$ is greater than the amplitude threshold $B_{th}$, $\beta_i=\alpha_i-\alpha_{i-1}$, or when 2≤i≤M and an amplitude of an $(i-1)^{th}$ symbol is less than or equal to the amplitude threshold $B_{th}$, $\beta_i=\alpha_i-\alpha_{i-1}+\beta_{i-1}-\alpha'_{i-1}$, where $\alpha'_{i-1}$ indicates a hard decision phase of the $(i-1)^{th}$ symbol, and the hard decision phase indicates a phase of a constellation point closest to the symbol in a constellation diagram. Coordinates of a symbol and a constellation point are respectively indicated by complex numbers as $a_1+b_1*j$ and $a_2+b_2*j$, so that a distance between the symbol and the constellation point=$\sqrt{(a_1-a_2)^2+(b_1-b_2)^2}$.

For example, five symbols obtained by the receiving device by performing symbol demodulation are $S_1(B_1, \alpha_1)$, $S_2(B_2, \alpha_2)$, $S_3(B_3, \alpha_3)$, $S_4(B_4, \alpha_4)$, and $S_5(B_5, \alpha_5)$. The receiving device compares an amplitude of each symbol with the preset amplitude threshold $B_{th}$. Assuming that $B_1>B_{th}$, $B_2<B_{th}$, $B_3<B_{th}$, $B_4>B_{th}$, and $B_5<B_{th}$, the amplitudes of the five symbols remain unchanged. After the receiving device performs reverse phase adjustment on the five symbols, when i=1, $\beta_1=\alpha_1$, when i=2, an amplitude of the first symbol is greater than the amplitude threshold, so that $\beta_2=\alpha_2-\alpha_1$, when i=3, an amplitude of the second symbol is less than the amplitude threshold, so that $\beta_3=\alpha_3-\alpha_2+\alpha_2-\alpha_1-\alpha'_2=\alpha_3-\alpha_1-\alpha'_2$, when i=4, an amplitude of the third symbol is less than the amplitude threshold, so that $\beta_4=\alpha_4-\alpha_3+\beta_3-\alpha'_3=\alpha_4-\alpha_1-\alpha'_2-\alpha'_3$, or when i=5, an amplitude of the fourth symbol is greater than the amplitude threshold, so that $\beta_5=\alpha_5-\alpha_4$.

S304: Perform, based on a preset constellation diagram, constellation demapping on M symbols obtained after the phase adjustment, to obtain M bit groups.

Specifically, a constellation diagram indicates a mapping relationship between a bit group and a constellation point. The receiving device uses a constellation diagram the same as that used by the sending device to perform the constellation demapping on the M symbols obtained after the phase adjustment, to obtain the M bit groups.

S305: Perform decoding processing on the M bit groups to obtain original data.

Specifically, the receiving device performs processing such as source decoding, channel decoding, and interleaved decoding on the M bit groups, to obtain the original data. In this case, decoding processing is an inverse process of the encoding processing in S201 in FIG. 2*a*.

It should be noted that the receiving device may perform digital demodulation processing on a plurality of symbol sets in a parallel manner by using S301 to S305. In this way, processing efficiency of the receiving device can be improved.

In a possible implementation, the first symbol in the M symbols may be a pilot symbol, symbols other than the first symbol in the M symbols each are a data symbol carrying service data, and information carried in the pilot symbol is known. In this way, all the data symbols carrying the service data can obtain differential gains during demodulation, thereby improving immunity to phase noise.

In a possible implementation, the constellation diagram may be an APSK constellation diagram, a QAM constellation diagram, or any other constellation diagram related to an amplitude change, that is, an amplitude of a constellation point in the constellation diagram has a change.

In a possible implementation, the constellation diagram is an APSK constellation diagram. In the APSK constellation diagram, constellation points form a plurality of concentric circles, and a plurality of constellation points are distributed at equal intervals on each circumference. Assuming that a quantity of concentric circles in the APSK constellation diagram is K, a signal set of the APSK constellation diagram may be indicated as $X=r_k*\exp^{(2\pi*i_k/n_k+\theta_k)}$, where k=i, 2, 3, ..., K, and k is an integer, $r_k$ indicates a radius of a $k^{th}$ circumference, $n_k$ indicates a quantity of constellation points on the $k^{th}$ circumference, $i_k$ indicates sequence numbers of the constellation points on the $k^{th}$ circumference, and $i_k$=0, 1, 2, ..., $n_k-1$, and $\theta_k$ indicates phases of the constellation points on the $k^{th}$ circumference. To fully use signal space in the APSK constellation diagram, that $n_k<n_{k+1}$ should be satisfied. To be specific, a quantity of constellation points on an outer circumference is greater than a quantity of constellation points on an inner circumference. In this embodiment of the present invention, the amplitude threshold $B_{th}$ should satisfy that $r_K<B_{th}<r_{K+1}$, that is, the amplitude threshold is between a radius of an outermost circumference and a radius of a second outermost circumference. Optionally, $B_{th}=(r_K+r_{K+1})/2$.

For example, the preset constellation diagram is the 64APSK constellation diagram shown in FIG. 2*b*. In this case, the amplitude threshold satisfies that $r_3<B_{th}<r_4$, that is, the amplitude threshold is between a radius of the fourth circumference and a radius of the third circumference.

In implementation of this embodiment of the present invention, the sending device accumulates a constellation phase of a symbol and a phase of a symbol whose amplitude is greater than the amplitude threshold in previous symbols. When receiving the symbol, the receiving device obtains a difference between the phase of the symbol and a previous closest symbol whose amplitude is greater than the amplitude threshold, to obtain a differential phase gain, thereby effectively eliminating a phase deflection caused by white noise introduced to a process in which the symbol is transmitted on a channel, and improving interference immunity to the phase deflection caused by the white noise.

The methods in the embodiments of the present invention are described in detail above, and apparatuses in the embodiments of the present invention are provided below.

Figure 4A:
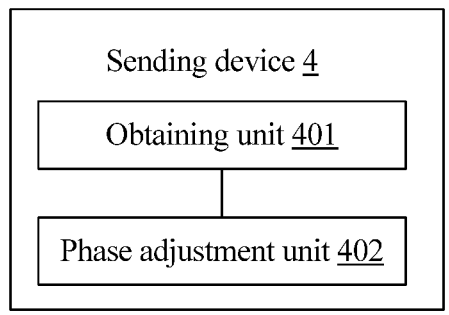
FIG. 4a is a schematic structural diagram of a sending device according to an embodiment of the present invention.

FIG. 4a is a schematic structural diagram of a sending device 4 according to an embodiment of the present invention. The sending device 4 may include an obtaining unit 401 and a phase adjustment unit 402.

In a possible implementation, functions of the units included in the sending device 4 are as follows.

The obtaining unit 401 obtains phases and amplitudes of M symbols, where M is an integer greater than 1, and the phases of the M symbols are respectively $\phi_1, \phi_2, \ldots,$ and $\phi_M$.

The phase adjustment unit 402 modulates the phases $\phi_i$ of the M symbols to $\theta_i$, where $1 \leq i \leq M$, and i is an integer. When i=1, $\theta_1 = \phi_1$, or when $2 \leq i \leq M$, $\theta_i = \phi_i + \phi_{sum}(i-1, A_{th})$, where $A_{th}$ indicates a preset amplitude threshold, and $\phi_{sum}(i-1, A_{th})$ indicates a sum of phases of all symbols whose amplitudes are greater than the amplitude threshold $A_{th}$ in a first symbol to an $(i-1)^{th}$ symbol.

In another possible implementation, functions of the units included in the sending device 4 are as follows.

The obtaining unit 401 is configured to obtain phases of M symbols, where the phases of the M symbols are respectively $\phi_1, \phi_2, \ldots,$ and $\phi_M$.

The phase adjustment unit 402 is configured to adjust the phases $\phi_i$ of the M symbols to $\theta_i$, where $1 \leq i \leq M$, and i is a positive integer. When i=1, $\theta_1 = \phi_1$, or when $2 \leq i \leq M$, $\theta_i = \phi_i + \phi_{i-1} + \ldots + \phi_1$.

Optionally, the sending device 4 further includes, an encoding unit, configured to perform encoding processing on original data to obtain a bit sequence, a grouping unit, configured to divide the bit sequence into M bit groups, and a constellation mapping unit, configured to perform constellation mapping on the M bit groups based on a preset constellation diagram, to obtain M symbols.

Optionally, the sending device 4 further includes, a modulation unit, configured to modulate M symbols obtained after the phase adjustment, to obtain modulated signals.

Optionally, the preset constellation diagram includes an APSK constellation diagram or a QAM constellation diagram.

Optionally, the first symbol in the M symbols is a pilot symbol.

Optionally, the preset constellation diagram is an amplitude phase shift keying APSK constellation diagram, the APSK constellation diagram has K circumferences, K is an integer greater than 1, and radii of the K circumferences are respectively $r_1, r_2, \ldots, r_{K-1}$, and $r_K$ from the inside to the outside, where $r_{K-1} < A_{th} < r_K$.

It should be noted that for implementation of each unit, refer to corresponding descriptions in the method embodiment shown in FIG. 2a.

According to the sending device 4 described in FIG. 4a, the sending device accumulates a constellation phase of a symbol and a phase of a symbol whose amplitude is greater than the amplitude threshold in previous symbols. When receiving the symbol, a receiving device obtains a difference between the phase of the symbol and a previous closest symbol whose amplitude is greater than the amplitude threshold, to obtain a differential phase gain, thereby effectively eliminating a phase deflection caused by white noise introduced in a process in which the symbol is transmitted on a channel, and improving interference immunity to the phase deflection caused by the white noise.

Figure 4B:
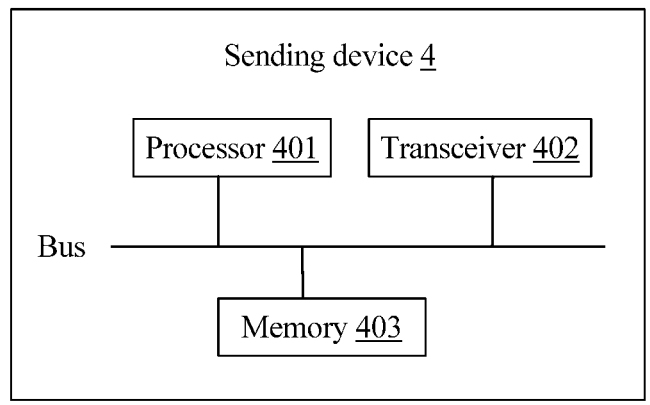
FIG. 4b is another schematic structural diagram of a sending device according to an embodiment of the present invention.

FIG. 4b shows a sending device 4 according to an embodiment of the present invention. The sending device 4 includes a processor 401, a memory 402, and a transceiver 403. The processor 401, the memory 402, and the transceiver 403 are connected to each other by using a bus.

The memory 402 includes but is not limited to a random access memory (RAM), a read-only memory (ROM), an erasable programmable read only memory (EPROM), or a compact disc read-only memory (CD-ROM). The memory 402 is configured to store a related instruction and related data. The transceiver 403 is configured to receive and send data. For example, the transceiver 403 may be a radio frequency antenna, a Bluetooth antenna, or a WiFi antenna.

The processor 401 may be one or more central processing units (CPUs). When the processor 401 is one CPU, the CPU may be a single-core CPU or a multi-core CPU.

In a possible implementation, the processor 401 in the sending device 4 is configured to read program code stored in the memory 402, to perform the following operations: obtaining phases and amplitudes of M symbols, where M is an integer greater than 1, and the phases of the M symbols are respectively $\phi_1, \phi_2, \ldots,$ and $\phi_M$, and modulating the phases $\phi_i$ of the M symbols to $\theta_i$ where $1 \leq i \leq M$, and i is an integer, and when i=1, $\theta_1 = \phi_1$, or when $2 \leq i \leq M$, $\theta_i = \phi_i + \phi_{sum}(i-1, A_{th})$, where $A_{th}$ indicates a preset amplitude threshold, and $\phi_{sum}(i-1, A_{th})$ indicates a sum of phases of all symbols whose amplitudes are greater than the amplitude threshold $A_{th}$ in a first symbol to an $(i-1)^{th}$ symbol.

In another possible implementation, the processor 401 in the sending device 4 is configured to read program code stored in the memory 402, to perform the following operations: obtaining phases of M symbols, where M is an integer greater than 1, and phases of the M symbols are respectively $\phi_1, \phi_2, \ldots,$ and $\phi_M$, and adjusting the phases $\phi_i$ of the M symbols to $\theta_i$, where $1 \leq i \leq M$, and i is a positive integer, and when i=1, $\theta_1 = \phi_1$, or when $21 \leq i \leq M$, $\theta_i = \phi_i + \phi_{i-1} + \ldots + \phi_1$.

Optionally, the processor 401 is further configured to modulate M symbols obtained after the phase adjustment, to obtain modulated signals Optionally, a preset constellation diagram includes an APSK constellation diagram or a QAM constellation diagram.

Optionally, the first symbol in the M symbols is a pilot symbol.

Optionally, the processor 401 is further configured to perform encoding processing on original data to obtain a bit sequence, divide the bit sequence into M bit groups, and perform constellation mapping on the M bit groups based on the preset constellation diagram, to obtain the M symbols.

Optionally, the preset constellation diagram is an amplitude phase shift keying APSK constellation diagram, the APSK constellation diagram has a total of K circumferences, K is an integer greater than 1, and radii of the K circumferences are respectively $r_1, r_2, \ldots, r_{K-1}$, and $r_K$ from the inside to the outside, where $r_{K-1} < A_{th} < r_K$.

It should be noted that for implementation of each operation, refer to corresponding descriptions in the method embodiment shown in FIG. 2a.

Figure 5A:
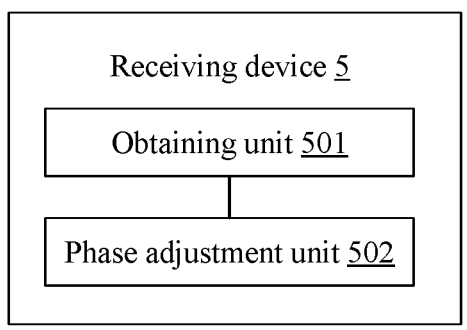
FIG. 5a is a schematic structural diagram of a receiving device according to an embodiment of the present invention.

FIG. 5a is a schematic structural diagram of a receiving device 5 according to an embodiment of the present invention. The receiving device 5 may include an obtaining unit 501 and a phase adjustment unit 502.

In a possible implementation, functions of the units included in the receiving device 5 are as follows.

The obtaining unit 501 is configured to obtain phases and amplitudes of M symbols, where the phases of the M symbols are respectively $\alpha_1, \alpha_2, \ldots,$ and $\alpha_M$, and M is an integer greater than 1.

The phase adjustment unit 502 is configured to adjust the phases $\phi_i$ of the M symbols to $\beta_i$, where $1 \leq i \leq M$, and i is an integer. When i=1, $\beta_1 = \alpha_1$, or when $2 \leq i \leq M$, $\beta_i = \alpha_i - \alpha_{min}(i-1, B_{th})$, where $B_{th}$ indicates a preset amplitude threshold, and $\alpha_{min}(i-1, B_{th})$ indicates a phase of a symbol that is closest to an $i^{th}$ symbol and whose amplitude is greater than the amplitude threshold $B_{th}$ in a first symbol to an $(i-1)^{th}$ symbol.

In another possible implementation, functions of the units included in the receiving device 5 are as follows.

The obtaining unit 501 is configured to obtain amplitudes and phases of M symbols, where the phases of the M symbols are respectively $\alpha_1, \alpha_2, \ldots,$ and $\alpha_M$, and M is an integer greater than 1.

The phase adjustment unit 502 is configured to adjust the phases $\alpha_i$ of the M symbols to $\beta_i$, where $1 \leq i \leq M$, and i is an integer. When i=1, $\beta_1 = \alpha_1$, when $2 \leq i \leq M$ and an amplitude value of an $(i-1)^{th}$ symbol is greater than an amplitude threshold $B_{th}$, $\beta_i = \alpha_i - \alpha_{i-1}$, or when $2 \leq i \leq M$ and an amplitude of an $(i-1)^{th}$ symbol is less than the amplitude threshold $B_{th}$, $\beta_i = \alpha_i - \alpha_{i-1} + \beta_{i-1} - \alpha_{i-1}$, where $\alpha_{i-1}$ indicates a hard decision phase of the $(i-1)^{th}$ symbol, and the hard decision phase indicates a phase of a constellation point closest to the $(i-1)^{th}$ symbol in a preset constellation diagram.

Optionally, the receiving device 5 further includes a demodulation unit, configured to receive modulated signals sent by a sending device, and perform demodulation processing on the modulated signals to obtain M symbols.

Optionally, the receiving device further includes a demapping unit and a decoding unit.

The demapping unit is configured to perform, based on a preset constellation diagram, constellation demapping on M symbols obtained after the phase adjustment, to obtain M bit groups.

The decoding unit is configured to perform decoding processing on the M bit groups to obtain original data.

Optionally, the preset constellation diagram includes an APSK constellation diagram or a QAM constellation diagram.

Optionally, the preset constellation diagram is an APSK constellation diagram, the APSK constellation diagram has a total of K circumferences, K is an integer greater than 1, and radii of the K circumferences are respectively $r_1, r_2, \ldots, r_{K-1},$ and $r_K$, where $r_{K-1} < B_{th} < r_K$.

It should be noted that for implementation of each operation, refer to corresponding descriptions in the method embodiment shown in FIG. 3.

In implementation of this embodiment of the present invention, the sending device accumulates a constellation phase of a symbol and a phase of a symbol whose amplitude is greater than the amplitude threshold in previous symbols. When receiving the symbol, the receiving device obtains a difference between the phase of the symbol and a previous closest symbol whose amplitude is greater than the amplitude threshold, to obtain a differential phase gain, thereby effectively eliminating a phase deflection caused by white noise introduced to a process in which the symbol is transmitted on a channel, and improving interference immunity to the phase deflection caused by the white noise.

Figure 5B:
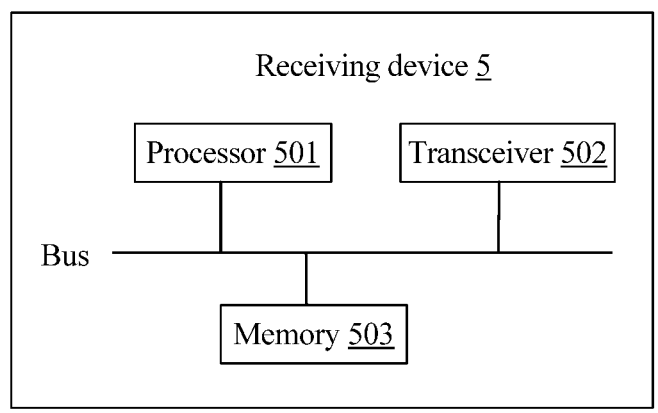
FIG. 5b is another schematic structural diagram of a receiving device according to an embodiment of the present invention.

FIG. 5b shows a receiving device 5 according to an embodiment of the present invention. The receiving device 5 includes a processor 501, a memory 502, and a transceiver 503. The processor 501, the memory 502, and the transceiver 503 are connected to each other by using a bus.

The memory 502 includes but is not limited to a random access memory (RAM), a read-only memory (ROM), an erasable programmable read only memory (EPROM), or a compact disc read-only memory (CD-ROM). The memory 502 is configured to store a related instruction and related data. The transceiver 503 is configured to receive and send data. For example, the transceiver 503 may be a radio frequency antenna, a Bluetooth antenna, or a WiFi antenna.

The processor 501 may be one or more central processing units (CPUs). When the processor 501 is one CPU, the CPU may be a single-core CPU or a multi-core CPU.

In a possible implementation, the processor 501 in the receiving device 5 is configured to read program code stored in the memory 502, to perform the following operations: obtaining phases and amplitudes of M symbols, where the phases of the M symbols are respectively $\alpha_1, \alpha_2, \ldots,$ and $\alpha_M$, and M is an integer greater than 1, and adjusting the phases $\alpha_i$ of the M symbols to $\beta_i$, where $1 \leq i \leq M$, and i is an integer, and when i=1, $\beta_1 = \alpha_1$, or when $2 \leq i \leq M$, $\beta_i = \alpha_i - \alpha_{min}(i-1, B_{th})$, where $B_{th}$ indicates a preset amplitude threshold, and $\alpha_{min}(i-1, B_{th})$ indicates a phase of a symbol that is closest to an $i^{th}$ symbol and whose amplitude is greater than the amplitude threshold $B_{th}$ in a first symbol to an $(i-1)^{th}$ symbol.

In another possible implementation, the processor 501 in the receiving device 5 is configured to read program code stored in the memory 502, to perform the following operations: obtaining amplitudes and phases of M symbols, where the phases of the M symbols are respectively $\alpha_1, \alpha_2, \ldots,$ and $\alpha_M$, and M is an integer greater than 1, and adjusting the phases $\alpha_i$ of the M symbols to $\beta_i$, where $1 \leq i \leq M$, and i is an integer, and when i=1, $\beta_1 = \alpha_1$, when $2 \leq i \leq M$ and an amplitude of an $(i-1)^{th}$ symbol is greater than an amplitude threshold $B_{th}$, $\beta_i = \alpha_i - a_{i-1}$, or when $2 \leq i \leq M$ and an amplitude value of an $(i-1)^{th}$ symbol is less than or equal to the amplitude threshold $B_{th}$, $\beta_i = \alpha_i - \alpha_{i-1} + \beta_{i-1} - \alpha_{i-1}$, where $\alpha_{i-1}$ indicates a hard decision phase of the $(i-1)^{th}$ symbol, and the hard decision phase indicates a phase of a constellation point closest to the $(i-1)^{th}$ symbol in a preset constellation diagram.

Optionally, the processor 501 is further configured to receive modulated signals sent by a sending device, and perform demodulation processing on the modulated signals to obtain M symbols.

Optionally, the processor 501 is further configured to perform, based on a preset constellation diagram, constellation demapping on M symbols obtained after the phase adjustment, to obtain M bit groups, and perform decoding processing on the M bit groups to obtain original data.

Optionally, the preset constellation diagram includes an APSK constellation diagram or a QAM constellation diagram.

Optionally, the preset constellation diagram is an APSK constellation diagram, the APSK constellation diagram has a total of K circumferences, K is an integer greater than 1, and radii of the K circumferences are respectively $r_1, r_2, \ldots, r_{K-1},$ and $r_K$, where $r_{K-1} < B_{th} < r_K$.

In implementation of this embodiment of the present invention, the sending device accumulates a constellation phase of a symbol and a phase of a symbol whose amplitude is greater than the amplitude threshold in previous symbols. When receiving the symbol, the receiving device obtains a difference between the phase of the symbol and a previous closest symbol whose amplitude is greater than the amplitude threshold, to obtain a differential phase gain, thereby effectively eliminating a phase deflection caused by white noise introduced to a process in which the symbol is transmitted on a channel, and improving interference immunity to phase noise.

A person of ordinary skill in the art may be aware that in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The foregoing storage medium includes any medium that can store program code, such as a ROM, a random access memory RAM, a magnetic disk, or an optical disc.

What is claimed is:

1. A phase adjustment method, comprising:
obtaining phases and amplitudes of M symbols, wherein M is an integer greater than 1, and wherein the phases of the M symbols are, respectively, $\phi_1, \phi_2, \ldots,$ and $\phi_M$; and
adjusting a phase $\phi_i$ of each of the M symbols to $\theta_i$, wherein $1 \leq i \leq M$, and i is an integer; and wherein the adjusting the phase $\phi_i$ of each of the M symbols to $\theta_i$ comprises performing at least one of:
setting $\theta_1 = \phi_1$ in response to i=1; or
setting $\theta_i = \phi_i + \phi_{sum}(i-1, A_{th})$ in response to $2 \leq i \leq M$, wherein $A_{th}$ indicates a preset amplitude threshold, and wherein $\phi_{sum}(i-1, A_{th})$ indicates a sum of phases of all symbols whose amplitudes are greater than the amplitude threshold $A_{th}$ in a group of one or more symbols from a first symbol to an $(i-1)^{th}$ symbol.

2. The method according to claim 1, further comprising:
performing encoding processing on original data to obtain a bit sequence;
dividing the bit sequence into M bit groups; and
performing constellation mapping on the M bit groups according to a preset constellation diagram, to obtain the M symbols.

3. The method according to claim 2, wherein the dividing the bit sequences into M bit groups comprises dividing the bit sequence into the M bit groups according a modulation order, wherein a quantity of bits included in each bit group of the M bit groups is equal to the modulation order.

4. The method according to claim 2, wherein the preset constellation diagram is an amplitude phase shift keying (APSK) constellation diagram, wherein the APSK constellation diagram has a total of K circumferences, wherein K is an integer greater than 1, wherein radii of the K circumferences are respectively $r_1, r_2, \ldots, r_{K-1},$ and $r_K$ from the inside to the outside, and wherein $r_{K-1} < A_{th} < r_K$.

5. The method according to claim 1, wherein the first symbol in the M symbols is a pilot symbol.

6. A phase adjustment method, comprising:
obtaining phases and amplitudes of M symbols, wherein the phases of the M symbols are, respectively, $\alpha_1, \alpha_2, \ldots, \alpha_M$, and wherein M is an integer greater than 1; and
adjusting a phase $\alpha_i$ of each of the M symbols to $\beta_i$, wherein and $1 \leq i \leq M$, and i is an integer, and wherein the adjusting the phase $\alpha_i$ of each of the M symbols to $\beta_i$ comprises performing at least one of:
setting $\beta_1 = \alpha_1$ in response to i=1; or
setting $\beta_i = \alpha_i - \alpha_{min}(i-1, B_{th})$ in response to $2 \leq i \leq M$, wherein $B_{th}$ indicates a preset amplitude threshold, and wherein $\alpha_{min}(i-1,B_{th})$ indicates a phase of a symbol that is closest to an $i^{th}$ symbol and whose amplitude is greater than the amplitude threshold $B_{th}$ in a group of one or more symbols from a first symbol to an $(i-1)^{th}$ symbol in the M symbols.

7. The method according to claim 6, further comprising performing, after the adjusting the phase $\alpha_i$ of each of the M symbols to $\beta_i$:
performing, based on a preset constellation diagram, constellation demapping on M symbols obtained after the phase adjustment, to obtain M bit groups; and
performing decoding processing on the M bit groups to obtain original data.

8. The method according to claim 7, wherein the M bit groups are divided according a modulation order, wherein a quantity of bits included in each bit group of the M bit groups is equal to the modulation order.

9. The method according to claim 7, wherein the preset constellation diagram is an amplitude phase shift keying (APSK) constellation diagram, wherein the APSK constellation diagram has a total of K circumferences, K is an integer greater than 1, and wherein radii of the K circumferences are, respectively, $r_1, r_2, \ldots, r_{K-1}$, and $r_K$ from the inside to the outside, where $r_{K-1}<B_{th}<r_K$.

10. The method according to claim 6, wherein the first symbol in the M symbols is a pilot symbol.

11. A sending device, comprising:
a processor; and
a non-transitory computer-readable storage medium storing a program to be executed by the processor, the program including instructions for:
obtaining phases and amplitudes of M symbols, wherein M is an integer greater than 1, and wherein the phases of the M symbols are, respectively, $\phi_1, \phi_2, \ldots,$ and $\phi_M$; and
adjusting the phases $\phi_i$ of the M symbols to $\theta_i$, wherein $1 \leq i \leq M$, wherein i is an integer, and wherein the adjusting the phases $\phi_i$ of the M symbols to $\theta_i$ comprises performing at least one of:
setting $\theta_1 = \phi_1$ in response to i=1; or
setting $\theta_i = \phi_i + \phi_{sum}(i-1, A_{th})$ in response to $2 \leq i \leq M$, wherein $A_{th}$ indicates a preset amplitude threshold, and wherein $\phi_{sum}(i-1, A_{th})$ indicates a sum of phases of all symbols whose amplitudes are greater than the amplitude threshold $A_{th}$ in a first symbol to an $(i-1)^{th}$ symbol.

12. The sending device according to claim 11, wherein the program further comprises instructions for:
performing encoding processing on original data to obtain a bit sequence;
dividing the bit sequence into M bit groups; and
performing constellation mapping on the M bit groups according to a preset constellation diagram, to obtain the M symbols.

13. The sending device according to claim 12, wherein the instructions for dividing the bit sequences into M bit groups include instructions for dividing the bit sequence into the M bit groups according a modulation order, wherein a quantity of bits included in each bit group of the M bit groups is equal to the modulation order.

14. The sending device according to claim 12, wherein the preset constellation diagram is an amplitude phase shift keying (APSK) constellation diagram, wherein the APSK constellation diagram has a total of K circumferences, wherein K is an integer greater than 1, and wherein radii of the K circumferences are, respectively, $r_1, r_2, \ldots, r_{K-1}$, and $r_K$ from the inside to the outside, where $r_{K-1}<A_{th}<r_K$.

15. The sending device according to claim 11, wherein the first symbol in the M symbols is a pilot symbol.

16. A receiving device, comprising:
a processor; and
a non-transitory computer-readable storage medium storing a program to be executed by the processor, the program including instructions for:
obtaining phases and amplitudes of M symbols, wherein M is an integer greater than 1, and the phases of the M symbols are respectively $\alpha_1, \alpha_2, \ldots,$ and $\alpha_M$, and wherein a first symbol in the M symbols is a pilot symbol;
adjusting a phase $\alpha_i$ of each of the M symbols to $\beta_i$, wherein $1 \leq i \leq M$, and wherein i is an integer; and
setting $\beta_1 = \alpha_1$ in response to i=1.

17. The receiving device according to claim 16, wherein the program further includes instructions for, after adjusting the phase $\alpha_i$ of each of the M symbols to $\beta_i$:
performing, according to the preset constellation diagram, constellation demapping on M symbols obtained after the phase adjustment, to obtain M bit groups; and
performing decoding processing on the M bit groups to obtain original data.

18. The receiving device according to claim 17, wherein the M bit groups are divided according a modulation order, wherein a quantity of bits included in each bit group of the M bit groups is equal to the modulation order.

19. The receiving device according to claim 17, wherein the preset constellation diagram is an APSK constellation diagram, wherein the APSK constellation diagram has a total of K circumferences, wherein K is an integer greater than 1, and wherein radii of the K circumferences are, respectively, $r_1, r_2, \ldots, r_{K-1}$, and $r_K$ from the inside to the outside, where $r_{K-1}<B_{th}<r_K$.

* * * * *